US006235379B1

United States Patent
Kameda et al.

(10) Patent No.: US 6,235,379 B1
(45) Date of Patent: *May 22, 2001

(54) CERAMIC MATRIX COMPOSITE AND METHOD OF MANUFACTURING THE SAME

(75) Inventors: Tsuneji Kameda, Tokyo; Yoshinori Hayakawa, Yokohama, both of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,245

(22) Filed: Aug. 19, 1997

(30) Foreign Application Priority Data

Aug. 20, 1996 (JP) .................................... 8-218826
Sep. 30, 1996 (JP) .................................... 8-259591

(51) Int. Cl.$^7$ ............................ B32B 17/12; B32B 18/00
(52) U.S. Cl. .................................... 428/293.4; 428/294.1; 428/332; 428/367; 428/368; 428/408; 428/446; 428/701; 428/704; 428/698; 501/88; 501/95.2
(58) Field of Search .................................... 428/698, 704, 428/366, 367, 368, 375, 378, 379, 380, 387, 408, 336, 446, 293.4, 294.1, 332, 701; 501/95.2, 92, 88, 89, 95; 156/89, 88

(56) References Cited

U.S. PATENT DOCUMENTS

| 4,931,311 | * | 6/1990 | Singh et al. | 427/56.1 |
| 4,944,904 | * | 7/1990 | Singh et al. | 269/60 |
| 5,043,303 | | 8/1991 | Singh et al. . | |
| 5,275,984 | | 1/1994 | Carpenter et al. . | |
| 5,294,489 | * | 3/1994 | Luthra et al. | 428/379 |
| 5,296,311 | * | 3/1994 | McMurtry et al. | 428/688 |
| 5,316,851 | * | 5/1994 | Burn et al. | 428/379 |
| 5,387,299 | * | 2/1995 | Singh et al. | 156/89 |
| 5,435,889 | * | 7/1995 | Dietrich | 216/63 |
| 5,552,352 | * | 9/1996 | Brun et al. | 501/88 |
| 5,730,096 | * | 3/1998 | Atmur et al. | 123/193.5 |

FOREIGN PATENT DOCUMENTS 2 250516    6/1992   (GB) .

* cited by examiner

Primary Examiner—Bruce H. Hess
Assistant Examiner—B. Shewareged
(74) Attorney, Agent, or Firm—Finnegan, Henderson, Farabow, Garrett, & Dunner, L.L.P.

(57) ABSTRACT

The ceramic matrix composite is constructed by a ceramic matrix containing SiC formed by a reaction sintering as a main phase and ceramic fibers comprising SiC compounded in this matrix. A coat layer that has been previously coated on the fibers is disposed between the fiber and the matrix. The layer is provided with a BN layer with a preset thickness covering on the surface of the fiber, a C layer with a preset thickness covering the BN layer, and a SiC layer with a preset thickness covering the C layer.

10 Claims, 1 Drawing Sheet

CERAMIC MATRIX COMPOSITE AND METHOD OF MANUFACTURING THE SAME

BACKGROUND OF THE INVENTION

The present invention relates to a ceramic matrix composite used for gas turbine members and the like and a method of manufacturing the composite, especially to a composite having a ceramic matrix formed by reaction sintering and ceramic fibers having a coat layer such as a sliding layer combined in the matrix.

In general, ceramic sintered bodies are used in wide fields such as components of industrial electric equipment, airplane members, automobile members, electronic equipment, precision machine members, electronic materials like semiconductor materials and structural materials because the they show little decrease in their strength up to a high temperature and have excellent properties in hardness, electric insulation, abrasion resistance, corrosion resistance and light weight compared with metallic materials.

However, the tensile stress of the ceramic sintered body is so weak compared with its compressive stress that it has a inherent drawback that, when there is a potential defect portion, a fracture develops in one moment under a tensile stress—so called brittleness—because the stress is focused on the defect portion. Actually, ceramic members are easily fractured by a collision of foreign materials, inhibiting its practical application for, for example, gas turbine members.

Therefore, it is strongly desired that the ceramic sintered bodies are endow with high tenacity or their fracture energy is increased for applying it to structural members of ceramics such as gas turbine members, air plane members and automobile members for which a high reliability as well as heat resistance and strength at a high temperature are require.

Under these requirements, ceramic matrix composite formed by dispersing and compounding composite materials such as fibers, whiskers, plates and grains comprising inorganic materials or metals in the matrix have been noticed as ceramic sintered bodies improved in fracture tenacity, fracture energy level and heat shock resistance, facilitating research and development of these materials for practical applications in many research institutes around the world. Especially, when fibers such are compounded into a ceramic matrix composite, their effects for improving fracture resistance become so large that their practical applications are expected.

Among these ceramic matrix composites, a composite material as a high temperature material having silicon carbide (SiC) in its matrix has been especially noticed. While examples of methods for synthesizing the SiC matrix in the composite material include, taking heat resistance of fibers into account, CVI (Chemical Vapor Infiltration) method, PC (precursor) method and a reaction sintering method, the reaction sintering method is noticed as a representative example by which an initial fracture strength can be so easily improved that a high reliability is obtained since a SiC matrix with a compact structure is formed by the method.

In the ceramic matrix composite described above, it is an important problem to adequately control the bonding at the boundary face between the matrix and fibers in order to display the composite effect of fibers, because the composite effects like bridging and pulling out are not fully displayed when fibers and the ceramics are tightly bonded, being liable to be fractured due to brittleness. As a countermeasure, a method for coating a sliding layer comprising boron nitride (BN) and the like is known in the art for allowing the fiber to slide against the matrix by weakening the bonding between the fiber and matrix.

However, the sliding layer described above had a problem that it was denatured, decomposed or disappeared by a reaction with the materials forming the matrix when a reaction sintering method was applied. When a reaction sintering method in which a SiC matrix is formed by impregnating a preform formed with ceramic fibers with molten Si is applied, the reactivity of the molten Si to be impregnated is so high that it readily reacts with the sliding layer or fiber itself, thereby sometimes arising a problem that the composite effect of fibers described above can not be fully exhibited.

As one of known method of suppressing the above reaction of the sliding layer with molten Si during the reaction sintering, there is a recently proposed ceramic matrix composite including not only the sliding layer but also a reaction suppressing layer such as a SiC layer covering the sliding layer.

The proposed ceramic matrix composite comprises a ceramic matrix having SiC formed by the reaction sintering as a main phase and ceramic fibers compounded in the matrix, wherein a BN layer as the sliding layer capable of inducing sliding of fibers against the matrix, and a SiC layer, which is a reaction suppressing layer suppressing a reaction of the BN layer with molten Si, are disposed between the matrix and fibers as a boundary layer.

The method for producing this ceramic matrix composite is described below. First, a BN layer is formed on the surface of fibers comprising SiC using CVD method, followed by forming a SiC layer on this BN layer using CVD method. Next, the fibers are bundled to form a bundle of fibers, which is formed into a fiber structure unit by braiding.

Then, a ceramic powder material is filled in the gaps among fibers in this fiber structure unit and in the vicinity of the fibers by a slip cast method followed by drying, thereby forming a molded body including fibers. This molded body is heated at 1420 to 1500° C. so that the molded body is impregnated with molten Si for allowing the C component in the molded body to react with molten Si, thereby compounding the fibers in the matrix containing SiC as a main phase. Thus, a ceramic matrix composite in which BN layer and SiC layer exist in the interface between both of the matrix and fibers can be obtained.

However, the ceramic matrix composite proposed in the example above had problems that cracks are so liable to generate in the SiC layer during braiding that molten Si invades into the BN layer through cracked portions in the SiC layer and reacts with the BN layer during the reaction sintering, that is, a part or, at worst, almost all of the BN layer disappears without exhibiting the effect of the SiC layer as a BN protective layer, thereby making it impossible to make a boundary layer of desired design to exist between the matrix obtained and the fibers.

Countermeasures for the above problems are proposed comprising 1) a method for producing a fiber structure unit by braiding in a state where a BN layer is formed on the surface of fibers, followed by forming SiC in this fiber structure unit by CVD method or CIV (Chemical Vapor Infiltration) method, and 2) a method for previously dissolving B into a solid Si before preparing molten Si.

According to method 1) above, such problems are supposed to arise that the difference in film thickness between the vicinity of the surface of this fiber structure unit and the interior of it becomes large by coating the fiber structure unit with SiC, and coating inside of the fiber structure unit is technically difficult. Therefore, this method is not always effective since much labor and time are required for overcoming the problems.

According to method 2) above, the phenomenon that B in the BN layer is dissolved into molten Si can be prevented to some degree when B is previously dissolved into a solid Si before preparing molten Si up to a solubility limit of B at the sintering temperature.

However, since SiC is formed during reaction sintering by a reaction of molten Si with C, there would be another problem that the apparent concentration of B in molten Si becomes so high that a quantity of B exceeding its solubility limit in the solid Si precipitates as silicon borate. The precipitated silicon borate blocks the pathway for impregnating with molten Si to prevent the reaction sintering.

As a countermeasure of this problem, it can be worked out that the quantity of B dissolved into solid Si before preparing molten Si may be previously lessened. However, this is also not always advantageous because controlling the amount of B dissolved into solid Si before preparing molten Si is difficult since, in this case, B in the BN layer is decomposed and dissolved in molten Si.

SUMMARY OF THE INVENTION

Accordingly, it is an general object of the present invention to provide a novel ceramic matrix composite and a method of manufacturing the same so as to allow desired fibers and a coat layer including a sliding layer covering thereon to exist in the ceramic matrix.

It is a more specific object of the present invention to more effectively suppress the reaction of the coat layer such as a BN layer covering the ceramic fiber with molten Si that invades through cracked portions even when they are present in a reaction suppressing layer such as a SiC layer covering the sliding layer as the coat layer.

It is another object of the present invention to leave ceramic fibers and a coat layer covering thereon in a perfect state in the matrix by more effectively suppressing the reaction of the highly reactive Si with the fiber and the coat layer during the reaction sintering.

For the purpose of attaining the problems described above, the ceramic matrix composite according to this invention comprising a ceramic matrix and a ceramic fiber compounded in the matrix in which there is a coat layer (boundary layer) between the fiber and matrix previously coated on the fiber is characterized in that the boundary layer is provided with a boron nitride layer covering the fiber, a carbon layer covering this boron nitride layer and a silicon carbide layer covering this carbon layer.

The matrix described above is a matrix containing silicon carbide formed by a reaction sintering as a main phase. Preferably, the fiber is a fiber comprising silicon carbide.

The functions of each of boundary layers according to this invention, i.e. layers of boron nitride (BN), silicon carbide (SiC) and carbon (C) will be described hereinafter.

1) Since the BN layer substantially forms a boundary layer between the ceramic fiber and ceramic matrix serving for weakening the bonding strength between the fiber and matrix, the layer prevents the cracks from being developed by absorbing the fracture energy, especially by being peeled off from the fiber or matrix during fracturing of the material or by allowing to fracture the BN layer itself, thereby preventing a catastrophic fracture of the matrix. Since the effect for absorbing the fracture energy by breaking the BN layer is strongly influenced by the thickness of the BN layer, it is desirable to set the thickness to a prescribed range (to be described hereinafter).

2) The SiC layer serves as a protective layer of the BN layer. Suppose that this SiC layer is absent, then the BN layer contacts with molten Si during the process in which a reaction sintering is carried out by impregnating with molten Si when the matrix is formed. Then, the BN layer is damaged because a reaction that allows B to dissolve in molten Si starts due to a decomposition of the BN layer into B and N, insufficiently effecting a characteristics of the ceramic matrix composite. Therefore, the contact of molten Si with the BN layer is prevented and the reaction of the BN layer with molten Si is suppressed by forming a compactly structured SiC layer on the BN layer. This SiC layer also serves for preventing the C layer from falling off and being damaged during the braiding step.

3) The C layer serves for sealing the cracked portion to prevent molten Si from contacting with the BN layer by forming SiC by a reaction with molten Si invading through the cracked portion in the SiC layer.

Therefore, in the ceramic matrix composite according to this invention, molten Si invading through this cracked portion and C in the C layer just under this cracked portion react with each other to form a SiC layer to prevent molten Si from invading even when a cracks has been generated in the SiC layer during the braiding step, so that this SiC layer completely prevents a reaction of molten Si from the cracked portion with the BN layer, making it possible for the desirable boundary layer to be present between the matrix obtained and fibers.

In the ceramic matrix composite according to this invention, the thickness of the BN layer is desirably in the range of 0.2 μm or more and 1.5 μm or less. When the thickness of the BN layer is less than 0.2 μm, the energy required for breaking the BN layer as well as the apparent bonding force between the fibers and matrix are increased while the apparent bonding force between the fibers and matrix is weakened due to a decrease in the energy required for breaking the BN layer when the thickness is more than 1.5 μm. The more preferable thickness of this BN layer is within a range of 0.4 μm or more and 1.2 μm or less.

In the ceramic matrix composite according to this invention, the thickness of the C layer is desirably in the range of 0.035 μm or more and 1.0 μm or less. When the thickness of the C layer is less than 0.035, the amount of C component sufficient for filling the cracks in the SiC layer by reacting with molten Si becomes so short that it is impossible to prevent molten Si from invading. When the thickness of the C layer is larger than 1.0 μm, the excessive C component after the reaction with molten Si is burned up when the material is used as a construction member in an oxidizing atmosphere at a high temperature. The burned portion leaves a vacancy between the BN layer and SiC layer forming a weakly bonded portion, thereby lessening the bonding force between the matrix and fibers. The thickness of this C layer is more preferably in the range of 0.1 μm or more and 0.5 μm or less.

In the ceramic matrix composite according to this invention, the thickness of SiC layer is desirably in the range of 0.2 μm or more and 1.0 μm or less. When the thickness of the SiC layer is less than 0.2 μm, a portion impossible to be coated with SiC layer may appear due to a restriction for coating the layer in a uniform thickness and, when the thickness is larger than 1.0 μm, there arises an undesirable problem that cracks tends to be often generated during the braiding step. The more desirable thickness of this SiC layer is in the range of 0.4 μm or more and 0.8 μm or less.

The ceramic matrix composite according to this invention can be in maximum effected its characteristic properties by using, for example, in an inner wall of combustion chambers of a gas turbine or a material for high temperature members like a mobile or static wing.

The ceramic matrix composite can be produced by the following method.

The method for producing a ceramic matrix composite according to this invention is characterized in that it comprises the steps of forming a boron nitride layer on the ceramic fiber, forming a carbon layer on this boron nitride layer, forming a silicon carbide layer on this carbon layer, weaving this fiber on which these three layers are formed into a fabric and forming a matrix of ceramics among the woven fibers.

According to this invention, as hitherto described, since a carbon layer is provided between the layers of boron nitride and silicon carbide as a boundary layer between the matrix of ceramics and ceramic fibers compounded in the matrix, molten Silicon invading through cracks reacts with carbon in the carbon layer and is trapped as silicon carbide even when there are cracked portions in the silicon carbide layer.

Therefore, the reaction of boron nitride with molten Silicon can be almost inhibited by this silicon carbide, making it possible to obtain a ceramic matrix composites in which there is a desirable boundary layer between the matrix obtained and fibers.

For the purpose of attaining the objects above, the present inventors have studied how to suppress the reaction of the highly reactive molten Si that is a matrix forming material with the fiber or sliding layer and noticed of the following facts.

First, there is a restriction that a matrix composition should have substantially no shrinkage on drying in order to effectively prevent generation of cracks accompanied by a heat shrinking in the molded body in which fibers are compounded. Accordingly, the matrix contains a prescribed quantity of free Si that disadvantageously affects on the strength and heat resistance in the matrix after the sintering, thereby increases the opportunity for contacting the molten Si with fibers during the reaction fusing. Increasing the opportunity for contacting the molten Si with fibers means that a reaction easily proceeds between them.

From the results above, it was concluded that the following countermeasures are effective. A structure unit composed of a bundle of fibers compounded in the matrix is used for effectively suppressing the reaction between Si and fibers while allowing to contain a prescribed amount of free Si in the matrix obtained. The composition of the matrix portion is adjusted so that there is a little free Si even when any shrinkage on drying occurs, since cracks generated by a shrinkage on drying less affect on deterioration of strength at the inside and in the vicinity of the bundle of fibers than at the matrix portion outside of the bundle of fibers, thereby reducing the opportunity of molten Si contacting with fibers.

The inventors found that, in completing the present invention, deterioration of strength due to shrinkage on drying can be sufficiently prevented by allowing a prescribed amount of free Si to remain in the matrix portion outside of the bundle of fibers. The reaction of molten Si impregnating during the reaction sintering with fibers can be also effectively prevented by the composition containing smaller amount of free Si in the matrix portion inside and in the vicinity of the bundle of fibers.

The ceramic matrix composite according to this invention comprising a matrix containing SiC formed by a reaction sintering as a main phase and a ceramic fiber compounded in this matrix, wherein a sliding layer capable of inducing sliding of said fiber at least against said matrix is formed on the boundary face between this fiber and matrix, is characterized in that the fiber comprises a structure unit composed of a bundle of fibers and the matrix has a composition in which the amount of free Si in an inner portion of the bundle of fibers is substantially less than the amount of free Si outer portion of the bundle of fibers.

As used herein "inner portion" includes not only an inside portion but also a vicinity portion of the bundle of fibers.

The matrix described above should desirably have a composition in which the content of free Si outside of the bundle of fibers is smaller than 25% by volume. When the content of free Si outside of the bundle of fibers is 25% by volume or more, a decrease in strength is observed because the occupation ratio of Si against SiC increases.

The matrix should more desirably have a composition in which the ratio between a and b (b/a) is 1.25 or more, provided that the content of free Si inside and in the vicinity of the bundle of fibers is a (in % by volume) and the content of free Si outside of the bundle of fibers is b (% by volume). When the composition of the matrix is adjusted to such content of free Si, the effect for suppressing the reaction can be more certainly exhibited.

The sliding layer should desirably comprise at least one material containing B, N, Si, C and O. BN or C is desirable, for example, as a component capable of exhibiting a sliding, SiC, $SiO_2$, $Si_3N_4$ or an amorphous component (Si—C—N—O component) being also possible to be compounded for sharing such functions as anti-oxidation.

The ceramic matrix composite described above can be produced by the following methods.

The method for producing a ceramic matrix composite according to this invention in which the fiber is compounded in a matrix containing SiC as a main phase by the steps comprising forming a structure unit with ceramic fibers and impregnating this structure unit with a material for the reaction sintering containing C component, followed by subjecting the C component to a reaction sintering with molten Si by impregnating the structure unit with molten Si, is characterized in what a method for controlling the amount of free Si in the matrix after the reaction sintering is used, wherein the inside and the vicinity of the bundle of fibers formed by bundling the fibers are impregnated with a material for the first reaction sintering whose composition has been previously adjusted based on the content of residual Si in said matrix prior to sintering, followed by impregnating the outside of the bundle of fibers with a material for the second reaction sintering whose composition has been previously adjusted so that the amount of said residual Si becomes larger than the amount of said material for the first reaction sintering is.

A slurry containing at least one of SiC powder, C powder, a ceramic precursor and a resin as a main component is desirably used for the materials of the first and second reaction sintering.

In using a slurry containing C powders, two kinds of C powders are prepared, for example, the material for the first reaction sintering being a slurry containing C powder with smaller grain size in larger proportion while the material for the second reaction sintering being the slurry containing C powder with larger grain size in larger proportion.

When a precursor of ceramics is used, the material for the first reaction sintering is a mixture of polycarbosilane and C powder while the material for the second reaction sintering is a mixture of polycarbosilane, C powder and SiC powder.

When a resin is used, the material for the first reaction sintering is a phenol resin while the material for the second reaction sintering is a mixture of a phenol resin and SiC powder.

According to this invention, as hitherto described, the reaction of the highly reactive molten Si with the fiber or sliding layer can be effectively suppressed at the inside of the bundle of fibers including its vicinity because the amount of free Si is substantially smaller inside and in the vicinity of the bundle of fibers than that outside of the bundle of fibers, enabling the fiber and sliding layer to remain in the matrix in a perfect state. Therefore, a ceramic matrix composite with a compact structure having SiC by a reaction sintering, which is excellent in anti-oxidation property, can be obtained with little deterioration of the characteristics of the fiber and its boundary face.

DESCRIPTION OF THE PREFERRED EMBODIMENTS

Figure 1:
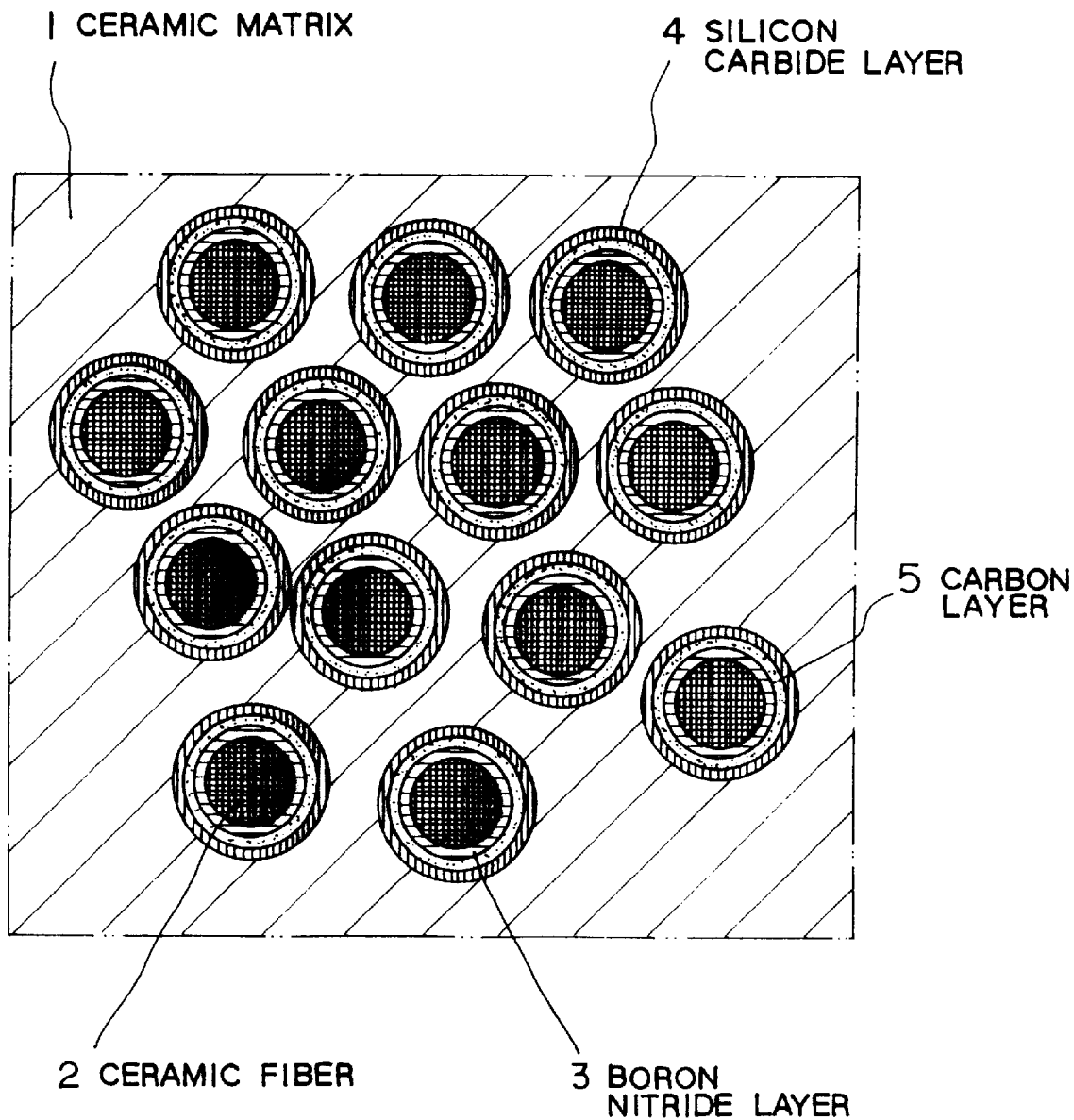
FIG. 1 is a conceptual drawing illustrating the construction of the ceramic matrix composite according to the present invention.

Embodiments of the ceramic matrix composite and the method for producing the same according to the present invention are described hereinafter in more detail.

First Embodiment

FIG. 1 is a conceptual view of the ceramic matrix composite according to the first embodiment. The ceramic matrix composite in FIG. 1 comprises a matrix 1 containing SiC formed by a reaction sintering as a main phase and fibers 2 comprising SiC that is compounded in this matrix 1, disposing the BN layer 3 and SiC layer 4 described above as well as the carbon (C) layer 5 between both of the layers 3 and 4.

The method for producing the ceramic matrix composite according to the first embodiment is described below.

A bundle of fibers formed into a yarn by bundling 500 to 2000 strings of fibers comprising SiC (made by Nippon Carbon Co., trade name: Hinicaron) 2 was prepared. The BN layer 3 is formed on the surface of this bundle of fibers using CVD method, the C layer 5 is formed on the BN layer 3 using CVD method and the SiC layer 4 is formed on the C layer 5 using CVD method. Then, the fibers 2 on which each boundary layer of BN layer 3 to C layer 5 is formed is subjected to braiding followed by forming, for example, a fiber structure unit braiding body) comprising 24 braid strings and 8 central strings.

A molded body containing the fibers 2 is produced by filling the gap and its vicinity of the fibers 2 of this fiber structure unit with a powder of ceramic materials using a slip cast method followed by drying. The powder C with a particle size of 0.01 to 1.00 μm and a dispersing agent, as well as a binder for allowing its powder configuration to hold during drying and a prescribed amount of pure water are used for preparing a slurry for the slip cast method. The mixture is crushed and mixed in a wet state for 10 to 20 hours using a pot mill.

The fibers 2 are compounded in the matrix 1 containing SiC as a main phase by heating the molded body described above at 1420 to 1500° C. in a vacuum to allow it to react with the C component in the molded body after impregnating it with molten Si, thereby obtaining a ceramic matrix composite in which the BN layer 3, C layer 5 and SiC layer 4 are present as boundary layers between the matrix 1 and fibers 2.

Accordingly, in this ceramic matrix composite, molten Si invading through a cracked portion in the SiC layer 4 reacts with C in the C layer 5 situated just under this cracked portion forming a fresh SiC by trapping Si. The reaction between molten Si and BN layer 3 is almost perfectly inhibited by this SiC serving as a barrier, thereby making a desired boundary layer with almost prescribed design possible to be present between the matrix 1 obtained by the reaction sintering and the fibers 2 compounded in this matrix 1.

For the purpose of testing the characteristic strength of this ceramic matrix composite, a plurality of ceramic matrix composite was prepared by the same method as described above, except that only the thicknesses of the BN layer, C layer and SiC layer were changed. Sample specimens cut off from the above samples were subjected to a three point flex test at room temperature and in an oxidizing atmosphere at 1300° C. For comparison, similar tests as above were also carried out on the sample without C layer as a boundary layer.

The characteristic strength of ceramic matrix composite according to this embodiment is described hereinafter referring to Table 1.

EXAMPLE 1

In Example 1, the thicknesses of BN layer, C layer and Si layer were 0.4 μm, 0.2 μm and 0.4 μm, respectively, as shown in FIG. 1. In the tree point flex test, the initial fracture strength σ1 and maximum strength σ2 at room temperature were 232 MPa and 605 MPa, respectively while, at 1300° C., σ1 and σ2 were 234 MPa and 602 MPa, respectively as shown in Table 1. Therefore, it was confirmed from Example 1 that, although the initial fracture strength is decreased as compared with that in the prior art where there is no C layer, the maximum strength is greatly increased. This is because the reaction of the BN layer with molten Si is more effectively suppressed by forming the C layer as a boundary layer between the BN layer and SiC layer.

EXAMPLE 2

In Example 2, the thicknesses of BN layer was 0.2 μm while the other experimental conditions were identical with those in Example 1. In the three point flex test, the initial fracture strength σ1 and maximum strength σ2 at room temperature were 288 MPa and 503 MPa, respectively while, at 1300° C., σ1 and σ2 were 289 MPa and 501 MPa, respectively as shown in Table 1. Accordingly, Example 2 showed a tendency to increase in the initial fracture strength and to decrease in the maximum strength at room temperature and at 1300° C. by making the thickness of the BN layer smaller than that in Example 1. This is because making the thickness of the BN layer small results in an increase in the fracture energy of the BN layer, enhancing the apparent bonding force between the matrix and fibers.

EXAMPLE 3

In Example 3, the thicknesses of BN layer was 1.5 μm while the other experimental conditions were identical with those in Example 1. In the three point flex test, the initial fracture strength σ1 and maximum strength σ2 at room temperature were 151 MPa and 645 MPa, respectively while, at 1300° C., σ1 and σ2 were 149 MPa and 645 MPa, respectively, as shown in Table 1. Accordingly, Example 3 showed a tendency to decrease in the initial fracture strength and to increase in the maximum strength at room temperature and at 1300° C. by making the thickness of the BN layer larger than that in Example 1. This is because making the thickness of the BN layer large results in a decrease in the fracture energy of the BN layer, weakening the apparent bonding force between the matrix and fibers.

EXAMPLE 4

In Example 4, the thicknesses of C layer was 0.035 μm while the other experimental conditions were identical with those in Example 1. In the three point flex test, the initial fracture strength σ1 and maximum strength σ2 at room temperature were 315 MPa and 472 MPa, respectively while, at 1300° C., σ1 and σ2 were 318 MPa and 479 MPa, respectively, as shown in Table 1. Accordingly, Example 4 showed a tendency to increase in the initial fracture strength and to decrease in the maximum strength at room temperature and at 1300° C. by making the thickness of the C layer smaller than that in Example 1. The reason is that making the thickness of the C layer small results in a deficiency of the C component sufficient for filling the cracks in the SiC layer, thereby making it impossible to sufficiently suppress invasion of molten Si through the cracked portion.

EXAMPLE 5

In Example 5, the thicknesses of C layer was 1.0 μm while the other experimental conditions were identical with those in Example 1. In the three point flex test, the initial fracture strength σ1 and maximum strength σ2 at room temperature were 115 MPa and 645 MPa, respectively while, at 1300° C., σ1 and σ2 were 118 MPa and 618 MPa, respectively, as shown in Table 1. Accordingly, Example 5 showed a tendency to decrease in the initial fracture strength and to increase in the maximum strength at room temperature and at 1300° C. by making the thickness of the C layer larger than that in Example 1. This is because, by making the thickness of the C layer large, the excessive C component that has not been consumed in the reaction with molten Si is burned up when the material is used as a construction member in an oxidizing atmosphere at a high temperature, forming a vacancy at the burned portion that causes weakening of the bonding force.

EXAMPLE 6

In Example 6, the thicknesses of SiC layer was 0.2 μm while the other experimental conditions were identical with those in Example 1. In the three point flex test, the initial fracture strength σ1 and maximum strength σ2 at room temperature were 271 MPa and 526 MPa, respectively while, at 1300° C., σ1 and σ2 were 276 MPa and 522 MPa, respectively, as shown in Table 1. Accordingly, Example 6 showed a tendency to increase in the initial fracture strength and to decrease in the maximum strength at room temperature and at 1300° C. by making the thickness of the SiC layer smaller than that in Example 1. This is because a portion impossible to be coated with SiC layer may appear due to a restriction for coating the layer in a uniform thickness by making the thickness of the SiC layer small, inhibiting the function of the BN layer as a protective layer to be effected.

EXAMPLE 7

In Example 7, the thicknesses of BN layer was 0.3 μm while the other experimental conditions were identical with those in Example 1. In the three point flex test, the initial fracture strength σ1 and maximum strength σ2 at room temperature were 258 MPa and 551 MPa, respectively while, at 1300° C., σ1 and σ2 were 260 MPa and 553 MPa, respectively, as shown in Table 1. Accordingly, Example 7 showed a tendency to increase in the initial fracture strength and to decrease in the maximum strength at room temperature and at 1300° C. as shown in Example 2 by making the thickness of the 13N layer smaller than that in Example

EXAMPLE 8

In Example 8, the thicknesses of BN layer was 0.6 μm while the other experimental conditions were identical with those in Example 1. In the three point flex test, the initial fracture strength σ1 and maximum strength σ2 at room temperature were 209 MPa and 638 MPa, respectively while, at 1300° C., σ1 and σ2 were 211 MPa and 640 MPa, respectively, as shown in Table 1. Accordingly, Example 8 showed a tendency to decrease in the initial fracture strength an to increase in the maximum strength at room temperature and at 1300° C. as shown in Example 3 by making the thickness of the BN layer larger than that in Example 1.

EXAMPLE 9

In Example 9, the thicknesses of BN layer was 1.0 μm while the other experimental conditions were identical with those in Example 1. In the three point flex test, the initial fracture strength σ1 and maximum strength σ2 at room temperature were 165 MPa and 645 MPa, respectively while, at 1300° C., σ1 and σ2 were 162 MPa and 647 MPa, respectively, as shown in Table 1. Accordingly, Example 9 showed a tendency to decrease in the initial fracture strength and to increase in the maximum strength at room temperature and at 1300° C. as shown in Example 3 by making the thickness of the BN layer larger than that in Example 1.

EXAMPLE 10

In Example 10, the thicknesses of BN layer was 1.4 μm while the other experimental conditions were identical with those in Example 1. In the three point flex test, the initial fracture strength σ1 and maximum strength σ2 at room temperature were 158 MPa and 643 MPa, respectively while, at 1300° C., σ1 and σ2 were 160 MPa and 640 MPa, respectively, as shown in Table 1. Accordingly, Example 10 showed a tendency to decrease in the initial fracture strength and to increase in the maximum strength at room temperature and at 1300° C. as shown in Example 3 by making the thickness of the BN layer larger than that in Example 1.

EXAMPLE 11

In Example 11, the thicknesses of C layer was 0.07 μm while the other experimental conditions were identical with those in Example 1. In the three point flex test, the initial fracture strength σ1 and maximum strength σ2 at room temperature were 300 MPa and 480 MPa, respectively while, at 1300° C., σ1 and σ2 were 305 MPa and 481 MPa, respectively, as shown in Table 1. Accordingly, Example 11 showed a tendency to increase in the initial fracture strength and to decrease in the maximum strength at room temperature and at 1300° C. as shown in Example 4 by making the thickness of the C layer smaller than that in Example 1.

EXAMPLE 12

In Example 12, the thicknesses of C layer was 0.16 μm while the other experimental conditions were identical with L those in Example 1. In the three point flex test, the initial fracture strength σ1 and maximum strength σ2 at room temperature were 245 MPa and 582 MPa, respectively while, at 1300° C., σ1 and σ2 were 246 MPa and 581 MPa, respectively, as shown in Table 1. Accordingly, Example 12 showed a tendency to increase in the initial fracture strength and to decrease in the maximum strength at room temperature and at 1300° C. as shown in Example 4 by making the thickness of the C layer smaller than that in Example 1.

EXAMPLE 13

In Example 13, the thicknesses of C layer was 0.3 μm while the other experimental conditions were identical with those in Example 1. In the three point flex test, the initial fracture strength σ1 and maximum strength σ2 at room temperature were 201 MPa and 635 MPa, respectively while, at 1300° C., σ1 and σ2 were 202 MPa and 610 MPa, respectively, as shown in Table 1. Accordingly, Example 13 showed a tendency to decrease in the initial fracture strength and to increase in the maximum strength at room temperature and at 1300° C. as shown in Example 5 by making the thickness of the C layer larger than that in Example 1.

EXAMPLE 14

In Example 14, the thicknesses of C layer was 0.8 μm while the other experimental conditions were identical with those in Example 1. In the three point flex test, the initial fracture strength σ1 and maximum strength σ2 at room temperature were 126 MPa and 641 MPa, respectively while, at 1300° C., σ1 and σ2 were 123 MPa and 610 MPa, respectively, as shown in Table 1. Accordingly, Example 13 showed a tendency to decrease in the initial fracture strength and to increase in the maximum strength at room temperature and at 1300° C. as shown in Example 5 by making the thickness of the C layer larger than that in Example 1.

EXAMPLE 15

In Example 15, the thicknesses of SiC layer was 0.3 μm while the other experimental conditions were identical with those in Example 1. In the three point flex test, the initial fracture strength σ1 and maximum strength σ2 at room temperature were 241 MPa and 601 MPa, respectively while, at 1300° C., σ1 and σ2 were 238 MPa and 601 MPa, respectively, as shown in Table 1. Accordingly, Example 15 showed a tendency to increase in the initial fracture strength but to be nearly identical in the maximum strength at room temperature and at 1300° C. as shown in Example 6 by making the thickness of the SiC layer smaller than that in Example 1.

EXAMPLE 16

In Example 16, the thicknesses of SiC layer was 0.5 pm while the other experimental conditions were identical with those in Example 1. In the three point flex test, the initial fracture strength σ1 and maximum strength σ2 at room temperature were 230 MPa and 581 MPa, respectively while, at 1300° C., σ1 and σ2 were 225 MPa and 582 MPa, respectively, as shown in Table 1. Accordingly, Example 16 showed a tendency to be nearly identical in the initial fracture strength but to decrease in the maximum strength at room temperature and at 1300° C. as shown in Example 7 by making the thickness of the SiC layer larger than that in Example 1.

EXAMPLE 17

In Example 17, the thicknesses of SiC layer was 0.7 μm while the other experimental conditions were identical with those in Example 1. In the three point flex test, the initial fracture strength σ1 and maximum strength σ2 at room temperature were 232 MPa and 455 MPa, respectively while, at 1300° C., σ1 and σ2 were 236 MPa and 460 MPa, respectively, as shown in Table 1. Accordingly, Example 17 showed a tendency to be nearly identical in the initial fracture strength but to decrease in the maximum strength at room temperature and at 1300° C. as shown in Example 7 by making the thickness of the SiC layer larger than that in Example 1.

COMPARATIVE EXAMPLE 1

In Comparative Example 1, the thicknesses of BN layer was 1.6 μm while the other experimental conditions were identical with those in Example 1. In the three point flex test, the initial fracture strength σ1 and maximum strength σ2 at room temperature were 145 MPa and 643 MPa, respectively while, at 1300° C., σ1 and σ2 were 144 MPa and 645 MPa, respectively, as shown in Table 1. Accordingly, especially the initial fracture strength at room temperature and at 1300° C. was largely decreased in Comparative Example 1 because the thickness of the BN layer was made larger than 1.5 μm.

COMPARATIVE EXAMPLE 2

In Comparative Example 2, the thicknesses of C layer was 0.03 μm while the other experimental conditions were identical with those in Example 1. In the three point flex test, the initial fracture strength σ1 and maximum strength σ2 at room temperature were 321 MPa and 468 MPa, respectively while, at 1300° C., σ1 and σ2 were 320 MPa and 464 MPa, respectively, as shown in Table 1. Accordingly, especially the maximum strength at room temperature and at 1300° C. was largely decreased in Comparative example 2 because the thickness of the C layer was made smaller than 0.035 μm.

COMPARATIVE EXAMPLE 3

In Comparative Example 3, the thicknesses of C layer was 1.2 μm while the other experimental conditions were identical with those in Example 1. In the three point flex test, the initial fracture strength σ1 and maximum strength σ2 at room temperature were 108 MPa and 642 MPa, respectively while, at 1300° C., σ1 and σ2 were 110 MPa and 619 MPa, respectively, as shown in Table 1. Accordingly, especially the initial fracture strength at room temperature and at 1300° C. was largely decreased in Comparative Example 3 because the thickness of the C layer was made larger than 1.0 μm.

COMPARATIVE EXAMPLE 4

In Comparative Example 4, the thicknesses of SiC layer was 0.15 μm while the other experimental conditions were identical with those in Example 1. In the three point flex test, the initial fracture strength σ1 and maximum strength σ2 at room temperature were 293 MPa and 526 MPa, respectively while, at 1300° C., σ1 and σ2 were 290 MPa and 521 MPa, respectively, as shown in Table 1. Accordingly, especially the maximum strength at room temperature and at 1300° C. was largely decreased in Comparative example 4 because the thickness of the SiC layer was made smaller than 0.2 μm.

TABLE 1

| Sample No. | Thickness of boundary layer (μ) | | | Three point flex strength (MPa) | | | |
| --- | --- | --- | --- | --- | --- | --- | --- |
| | | | | Room tempreture | | 1300° C. | |
| | BN layer | C layer | SiC layer | σ 1 | σ 2 | σ 1 | σ 2 |
| Ex. 1 | 0.4 | 0.2 | 0.4 | 232 | 605 | 234 | 602 |
| Ex. 2 | 0.2 | 0.2 | 0.4 | 288 | 503 | 289 | 501 |
| Ex. 3 | 1.5 | 0.2 | 0.4 | 151 | 645 | 149 | 645 |
| Ex. 4 | 0.4 | 0.035 | 0.4 | 315 | 472 | 318 | 479 |
| Ex. 5 | 0.4 | 1.0 | 0.4 | 115 | 645 | 118 | 618 |
| Ex. 6 | 0.4 | 0.2 | 0.2 | 271 | 526 | 276 | 522 |
| Ex. 7 | 0.3 | 0.2 | 0.4 | 258 | 551 | 260 | 553 |
| Ex. 8 | 0.6 | 0.2 | 0.4 | 209 | 638 | 211 | 640 |
| Ex. 9 | 1.0 | 0.2 | 0.4 | 165 | 645 | 162 | 647 |
| Ex. 10 | 1.4 | 0.2 | 0.4 | 158 | 643 | 160 | 640 |
| Ex. 11 | 0.4 | 0.07 | 0.4 | 300 | 480 | 305 | 481 |
| Ex. 12 | 0.4 | 0.16 | 0.4 | 245 | 582 | 246 | 581 |
| Ex. 13 | 0.4 | 0.3 | 0.4 | 201 | 635 | 202 | 610 |
| Ex. 14 | 0.4 | 0.8 | 0.4 | 126 | 641 | 123 | 610 |
| Ex. 15 | 0.4 | 0.2 | 0.3 | 241 | 601 | 238 | 601 |
| Ex. 16 | 0.4 | 0.2 | 0.5 | 230 | 581 | 225 | 582 |
| Ex. 17 | 0.4 | 0.2 | 0.7 | 232 | 455 | 236 | 460 |
| Comp. Ex. 1 | 1.6 | 0.2 | 0.4 | 145 | 643 | 144 | 645 |
| Comp. Ex. 2 | 0.4 | 0.03 | 0.4 | 321 | 468 | 320 | 464 |
| Comp. Ex. 3 | 0.4 | 1.2 | 0.4 | 108 | 642 | 110 | 619 |
| Comp. Ex. 4 | 0.4 | 0.2 | 0.15 | 293 | 526 | 290 | 521 |
| Prior Art | 0.4 | — | 0.4 | 330 | 450 | 332 | 448 |

Note:
σ 1: Initial fracture strength
σ 2: Maxim stregth

Second Embodiment

In the second embodiment, a bundle of fibers (yarns) prepared by bundling 500 strings of SiC based ceramic fibers (made by Nippon Carbon Co., trade name: Hinicaron) with a diameter of 14 μm was prepared, a sliding layer with a prescribed thickness being formed on the surface of mono filament of the fiber, and a sheet of plane weave cloth was woven from this bundle of fibers.

This plane weave cloth was immersed into and impregnated with a first slurry (slip). The first slurry used was a mixture of a carbon powder with a central diameter of about 30 nm (30 wt %), pure water (65 wt %) and a detergent (5 wt %).

A preform was formed by laminating this plane weave cloth after drying. This preform was set in a mold made of a porous resin (volume ratio of the fiber Vf=27%) to obtain a molded body by impregnating it with a second slurry (slip), followed by molding and drying. The second slurry used above contains SiC powder (70 wt %) and granular carbon powder (30 wt %) with a central particle size of about 5 nm as solid fractions, into which pure water (47 wt %) and a detergent (3 wt %) were added to make the final solid fractions of 50 wt %.

As described above, a method for controlling the amount of residual Si inside (including in the vicinity) and outside of the bundle of fibers in the matrix obtained by a reaction sintering was used depending on the amount of filled C based on the particle size distribution and composition of the powder to be impregnated, by independently impregnating the bundle of fibers and preform with each two kind of slurry. Increasing the amount of filled C per unit volume of the open space excluding the filled space with SiC means that the amount of unreacted Si remaining during the reaction with molten Si decreases.

The molded body formed by controlling the amount of residual Si as described above was made to contact with a fused metallic Si (purity 99.9%), followed by allowing to synthesize SiC by a reaction sintering in the matrix by heating at 1430° C. for 5 hrs in a vacuum to impregnate the molded body with the molten Si, thereby obtaining a ceramic matrix composite having a composition in which the amount of free Si inside and in the vicinity of the bundle of fibers is less than that outside of the bundle of fibers in the matrix.

Accordingly, since the reaction of highly reactive molten Si with the fiber or sliding layer is more effectively suppressed inside and in the vicinity of the bundle of fibers in this composite material, the sliding layer and fiber can exist in the matrix in more perfect state.

For the purpose of verifying the characteristics of this ceramic matrix composite, a plurality of ceramic matrix composites was obtained by a nearly identical production process as described above, except that the amount of free Si in the matrix was changed. Sample pieces with a prescribed size (Example 18 to 20) were cut off from this for each test described below.

The characteristics of ceramic matrix composites according to this embodiment are described referring to Table 2.

EXAMPLE 18

As shown in Table 2, the density of the composite material in Example 18 was 3.0 g/cm$^3$ while, regarding the amount of free Si (the amount inside and in the vicinity of the bundle of fibers is denoted as a and that outside of the bundle of fibers is denoted as b hereinafter), a, b and the ratio between the two (b/a) were 16% by volume, 21% by volume and 1.31, respectively.

Regarding the three point flex strength at room temperature, the initial flex fracture strength σ1 and maximum strength σ2 were 200 MPa and 490 MPa, respectively. When the fracture energy was estimated based on a deformation curve under a load in the three point flex test, the effective fracture energy γ was 6.9 KJ/m$^2$, showing a stable fracture behavior characteristic to the composite material in which a complete fracturing does not develop in one stroke. An observation of the fractured face under SEM (scanning electron microscope) revealed that BN layer uniformly and perfectly remained on each string of mono filament, clearly confirming that each fiber is evidently pulled out.

EXAMPLE 19

As shown in Table 2, the density of the composite material obtained in Example 19 was 3.0 g/cm$^3$. The amount of free Si, a, b and the ratio between the two (b/a) were 18% by volume, 21% by volume and 1.17, respectively.

Regarding the three point flex strength at room temperature, σ1 and σ2 were 210 MPa and 410 MPa, respectively and γ was 5.8 kJ/m$^2$, showing a stable fracture behavior characteristic to the composite material in which a complete fracturing does not develop in one stroke. An observation of the fractured face under SEM (scanning electron microscope) revealed that BN layer uniformly and perfectly remained on each string of monofilament, clearly confirming that each fiber is evidently pulled out.

EXAMPLE 20

As shown in Table 2, the density of the composite material obtained in Example 20 was 3.0 g/cm$^3$. The amount of free Si, a, b and the ratio between the two (b/a) were 17% by volume, 26% by volume and 1.53, respectively.

Regarding the three point flex strength at room temperature, σ1 and σ2 were 200 MPa and 440 MPa, respectively and γ was 6.1 kJ/m$^2$, showing a stable fracture behavior characteristic to the composite material in which a complete fracturing does not develop in one stroke. An observation of the fractured face under SEM (scanning electron microscope) revealed that BN layer uniformly and perfectly remained on each string of monofilament, clearly confirming that each fiber is evidently pulled out.

respectively and γ was 3.6 kJ/m$^2$, which were smaller than the values in the examples described above. Although the fracture does not develop in one stroke, the fracture behavior was more resembled to that of brittle fracture. An observation of the fractured face under SEM (scanning electron microscope) revealed that BN layer was partly disappeared due to a reaction with molten Si, clearly confirming that the fiber and matrix were fused together at the portion where BN layer had disappeared.

COMPARATIVE EXAMPLE 6

A ceramic matrix composite was obtained in by an approximately identical production process as in Comparative Example 6, except that b was made to 26% by volume and a test was carried out using this cut-off sample piece. As shown in Table 2, the density of the composite material obtained was 3.0 g/cm$^3$. The amount of free Si, a, b and the ratio of them (b/a) was 26% by volume, 26% by volume and 1.00, respectively.

Regarding the three point flex strength, σ1 was 290 MPa while σ2 could not be confirmed since the sample showed a brittle fracture. The effective fracture energy y was 0.7 kJ/m$^2$ that is smaller than the values compared with those in each example described above. Although the fracture does not develop in one stroke, the fracture behavior was more resembled to that of brittle fracture. An observation of the fractured face under SEM (scanning electron microscope) revealed that BN layer was partly disappeared due to a reaction with molten Si as shown in Comparative Example 1 above, clearly confirming that the fiber and matrix were fused together at the portion where BN layer had disappeared.

TABLE 2

| Sample No. | Density (g/cm$^3$) | Free Si in matrix a (vol. %) | b (vol. %) | b/a | Kind of sliding layer | Three point flex strength (room temperature) σ 1 (Mpa) | σ 2 (Mpa) | γ (kJ/m$^2$) |
|---|---|---|---|---|---|---|---|---|
| Ex. 18 | 3.0 | 16 | 21 | 1.31 | BN | 200 | 490 | 6.9 |
| Ex. 19 | 3.0 | 18 | 21 | 1.17 | BN | 210 | 410 | 5.8 |
| Ex. 20 | 3.0 | 17 | 26 | 1.53 | BN | 200 | 440 | 6.1 |
| Comp. Ex. 5 | 3.0 | 22 | 21 | 0.95 | BN | 280 | 290 | 3.6 |
| Comp. Ex. 6 | 3.0 | 26 | 26 | 1.00 | BN | 290 | Not confirmed | 0.7 |

Note:
σ 1: Initial fracture strength
σ 2: Maxim stregth
γ: Effective fracture strengt

COMPARATIVE EXAMPLE 5

In Comparative Example 5, a ceramic matrix composite was obtained by an approximately identical production process as described above, except that the preform was impregnated with the second slurry without using the first slurry. The tests as described above were carried out using a sample piece cut off from the sample above.

As shown in Table 2, the density of the composite material obtained in Example 3 was 3.0 g/cm$^3$. The amount of free Si, a, b and the ratio between the two (b/a) were 22% by volume, 21% by volume and 0.95, respectively.

Regarding the three point flex strength at room temperature, σ1 and σ2 were 280 MPa and 290 MPa, In another examples where 1) at least one kind of material comprising B, N, C, Si and O instead of BN was used as a sliding layer and 2) a slurry mainly containing a ceramic precursor was used and a slurry mainly containing a resin was used in the production process, nearly identical results as described above were obtained.

The invention may be embodied on other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A ceramic matrix composite comprising:
   a ceramic matrix having a main phase of SiC and a remaining phase including free Si, said SiC being formed by reaction sintering between a molten silicon (Si) and a carbon (C) component, said free Si being formed in said SiC by a solidification of said molten Si remained after said reaction sintering; and
   a ceramic fiber being combined with the ceramic matrix, the ceramic fiber comprising a bundle of fibers bundled together to form a yarn in which said molten Si and C component infiltrate and react together during the reaction sintering, each of the fibers having a coat layer thereon, said ceramic matrix having a composition in which the ratio between a and b (b/a) is more than 1.00, provided that a content of the free Si in an inner portion located inside and in the vicinity of said yarn is a % by volume and the content of the free Si in an outer portion located outside of said vicinity of the said yarn is b % by volume.

2. A ceramic matrix composite according to claim 1, wherein the content of the free Si in the outer portion is smaller than 25% by volume of the composite.

3. A ceramic matrix composite according to claim 1, wherein said ratio is 1.17 or more.

4. A ceramic matrix composite according to claim 1, wherein the coat layer comprises a material containing at least one selected from the group consisting of BN, SiC, $SiO_2$, $Si_3N$, Si—C—N—O amorphous component and mixtures thereof.

5. A ceramic matrix composite according to claim 4, wherein the coat layer includes a boron nitride (BN) layer covering the ceramic fiber thereon so as to decrease bounding force between the ceramic matrix and the ceramic fiber.

6. A ceramic matrix composite according to claim 5, wherein the coat layer includes a carbon (C) layer covering the BN layer and a silicon carbide (SiC) layer covering the C layer.

7. The ceramic matrix composite according to claim 6, wherein the ceramic fiber is a fiber comprising SiC.

8. The ceramic matrix composite according to claim 6, wherein the BN layer has a thickness of 0.2 $\mu$m or more and 1.5 $\mu$m or less.

9. The ceramic matrix composite according to claim 6, wherein the C layer has a thickness of 0.035 $\mu$m or more and 1.0 $\mu$m or less.

10. The ceramic matrix composite according to claim 6, wherein the SiC layer has a thickness of 0.2 $\mu$m or more and 1.0 $\mu$m or less.

* * * * *